United States Patent [19]

Saitoh

[11] Patent Number: 5,636,037
[45] Date of Patent: Jun. 3, 1997

[54] MODEM UNIT

[75] Inventor: Kazuhito Saitoh, Yokohama, Japan

[73] Assignee: Ricoh Company, Ltd., Tokyo, Japan

[21] Appl. No.: 300,198

[22] Filed: Sep. 2, 1994

Related U.S. Application Data

[63] Continuation of Ser. No. 41,414, Mar. 31, 1993, abandoned.

[30] Foreign Application Priority Data

Apr. 1, 1992 [JP] Japan ................ 4-109306

[51] Int. Cl.$^6$ ............... H04N 1/00; H04N 1/32; H04B 1/38; H04M 11/00
[52] U.S. Cl. ............ 358/442; 358/400; 358/468; 379/100; 375/222; 375/223
[58] Field of Search ............... 375/222, 223; 379/100; 358/400, 442, 468

[56] References Cited

U.S. PATENT DOCUMENTS

| | | | |
|---|---|---|---|
| 4,680,773 | 7/1987 | Amundson | 375/8 |
| 4,771,417 | 9/1988 | Maxwell | 370/35 |
| 4,931,250 | 6/1990 | Greszczak | 375/8 |
| 5,041,918 | 8/1991 | Ishida | 358/442 |
| 5,065,427 | 11/1991 | Godbole | 379/100 |
| 5,166,975 | 11/1992 | Maei | 379/93 |
| 5,192,999 | 3/1993 | Graczyk | 358/85 |
| 5,349,635 | 9/1994 | Scott | 379/97 |

OTHER PUBLICATIONS

Ty IN 2000 Oct. 1992 pp. 1, 2.

*Primary Examiner*—Sandra L. O'Shea
*Assistant Examiner*—John Ning
*Attorney, Agent, or Firm*—Oblon, Spivak, McClelland, Maier & Neustadt, P.C.

[57] ABSTRACT

A modem unit includes a data communication modem having data communication functions, a facsimile communication modem having facsimile communication functions, and a controller which is coupled to the data communication modem and the facsimile communication modem. The controller controls the data communication modem and the facsimile communication modem so that non-image facsimile data is communicated via the data communication modem and image facsimile data is transferred via the facsimile communication modem. Communication time is thus shortened through the provision of both the data communication modem and the facsimile communication modem in communicating facsimile data.

15 Claims, 7 Drawing Sheets

MODEM UNIT

This application is a Continuation of application Ser. No. 08/041,414, filed on Mar. 31, 1993, now abandoned.

BACKGROUND OF THE INVENTION

The present invention generally relates to modem units, and more particularly to a modem unit which is provided with advantageous functions of both data communication and facsimile communication.

Recently, when using a modem card with a personal computer such as a portable or lap-top personal computer, it has become possible to utilize both the facsimile communication function and the data communication function. The modem card is also sometimes referred to as a communication card.

On the other hand, the standards for the Group III facsimile machines are prescribed under CCITT Recommendations T4, T30, V21, V27ter, V29. The standards for the data communication are prescribed under MNP-4, CCITT V22, V22bis, V42, V42bis.

Figures 1, 2:
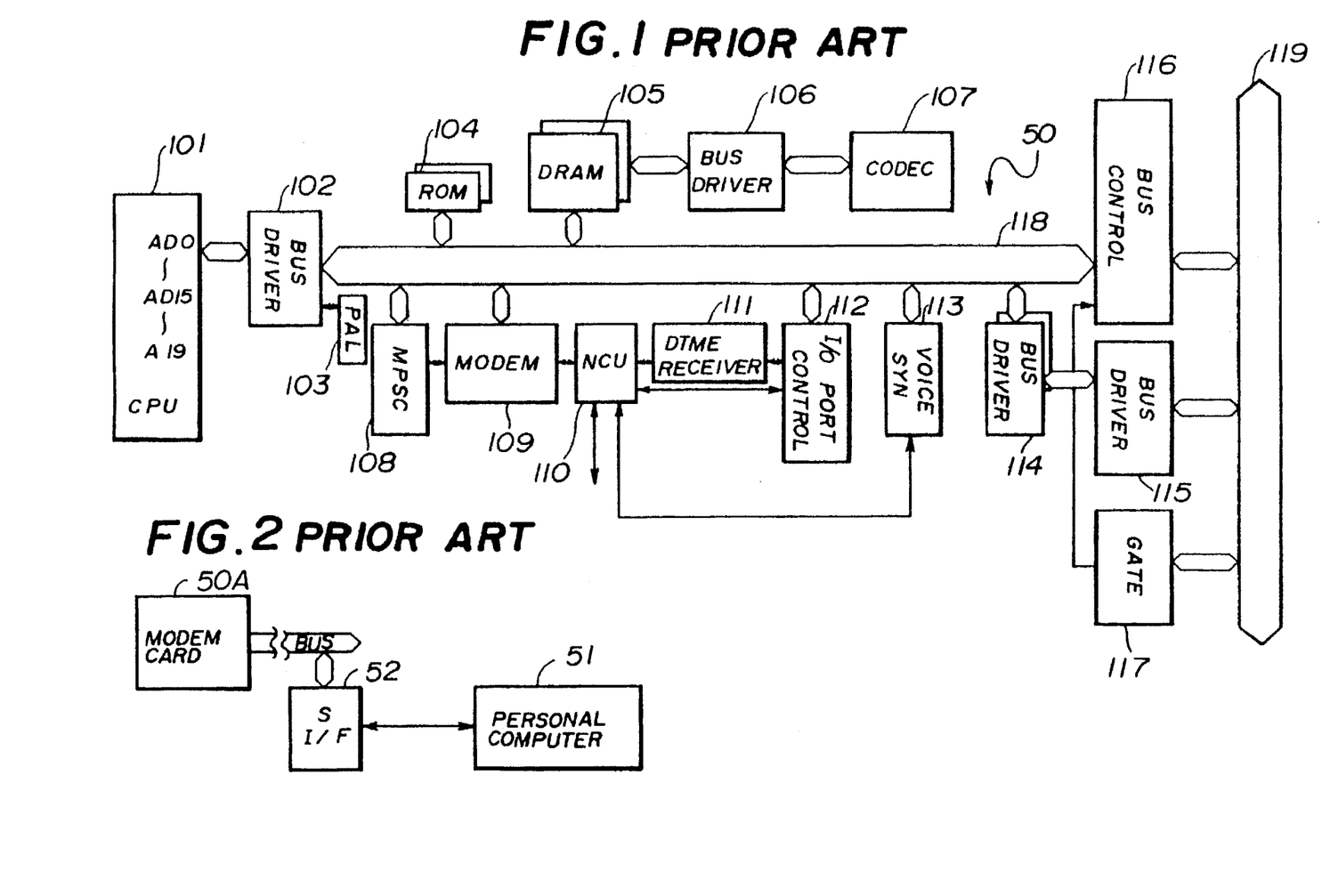
FIG. 1 is a system block diagram showing an example of a conventional modem card.
FIG. 2 is a system block diagram showing another example of the conventional modem card which is coupled to a personal computer.

FIG. 1 shows an example of a conventional modem card. A modem card 50 shown in FIG. 1 uses microchannels as an interface between the modem card 50 and a personal computer which serves as a host. The modem card 50 includes various kinds of peripheral large scale integrated circuits (LSIs) which are coupled to a CPU bus, and controls the Group III facsimile communication function by firmware. As the modem function, the modem card 50 is provided with only the Group III facsimile modem V21, V27ter, V29.

In FIG. 1, a CPU 101 is made up of a chip model 80C186, for example, and controls each of the blocks shown in FIG. 1 and controls the facsimile procedure. A bus driver 102 is made up of a chip model TE7730, for example, and couples address and data buses of the CPU 101 to a local bus 118. A programmable array logic 103 is coupled to the bus driver 102, and carries out decoding of the address and forming of an input/output control signal based on a control signal from the CPU 101. A read only memory (ROM) 104 stores program codes for controlling the CPU 101, and a dynamic random access memory (DRAM) 105 is used as a work memory for temporarily storing data for control.

A bus driver 106 is made up of a chip TE7730, for example, and couples the data bus to a codec 107. The codec 107 is made up of a chip model HPD72185, for example, and carries out compression and expansion, that is, coding and decoding, of the image data. A multi protocol sequence controller 108 controls the communication sequence. A modem 109 carries out modulation and demodulation in conformance with the facsimile procedure (V21, V27ter., V29). A network control unit 110 controls the line.

A DTMF receiver 111 is made up of a chip model MSM6893, for example, and receives the DTMF signal. An input/output port controller 112 controls the input/output ports. A voice synthesis circuit 113 is made up of a chip model MSM6258, for example, and carries out an ADPCM voice synthesis. The voice synthesis circuit 113 also has recording and reproducing functions. Bus drivers 114 and 115 are respectively made up of a chip model TE7730, for example, and provide an interface between a microchannel bus 119 and the local bus 118. A bus controller 116 is made up of a gate array, and controls the microchannel interface. A gate 117 is provided for interrupt purposes.

FIG. 2 shows another example of the conventional modem card. A modem card 50A shown in FIG. 2 is coupled to a personal computer 51 via a serial interface 52.

However, conventional modem cards require a relatively long communication time. For this reason, there are demands to reduce the required communication time of the modem card. More particularly, there are demands to realize a modem unit in which the communication time of the Group III facsimile communication is shortened and the communication of high quality text data is made possible.

SUMMARY OF THE INVENTION

Accordingly, it is a general object of the present invention to provide a novel and useful modem in which the problems described above are eliminated.

Another and more specific object of the present invention is to provide a modem unit comprising a data communication modem having data communication functions, a facsimile communication modem having facsimile communication functions, and control means, coupled to the data communication modem and the facsimile communication modem, for controlling the data communication modem and the facsimile communication modem so that a facsimile message is transferred via the data communication modem and image data is transferred via the facsimile communication modem. According to the modem unit of the present invention, it is possible to shorten the communication time, and to transfer text data having high quality.

Other objects and further features of the present invention will be apparent from the following detailed description when read in conjunction with the accompanying drawings.

BRIEF DESCRIPTION OF THE DRAWINGS

FIG. 5 in parts (A) and (B) is a diagram for explaining the operation of a second embodiment of the modem unit according to the present invention;

FIG. 8 in parts (A), (B) and (C) is a diagram for explaining a transfer sequence, additional data and the like used in a fifth embodiment of the modem unit according to the present invention.

DESCRIPTION OF THE PREFERRED EMBODIMENTS

First, a description will be given of a first embodiment of a modem unit according to the present invention, by referring to FIG. 3.

Figure 3:
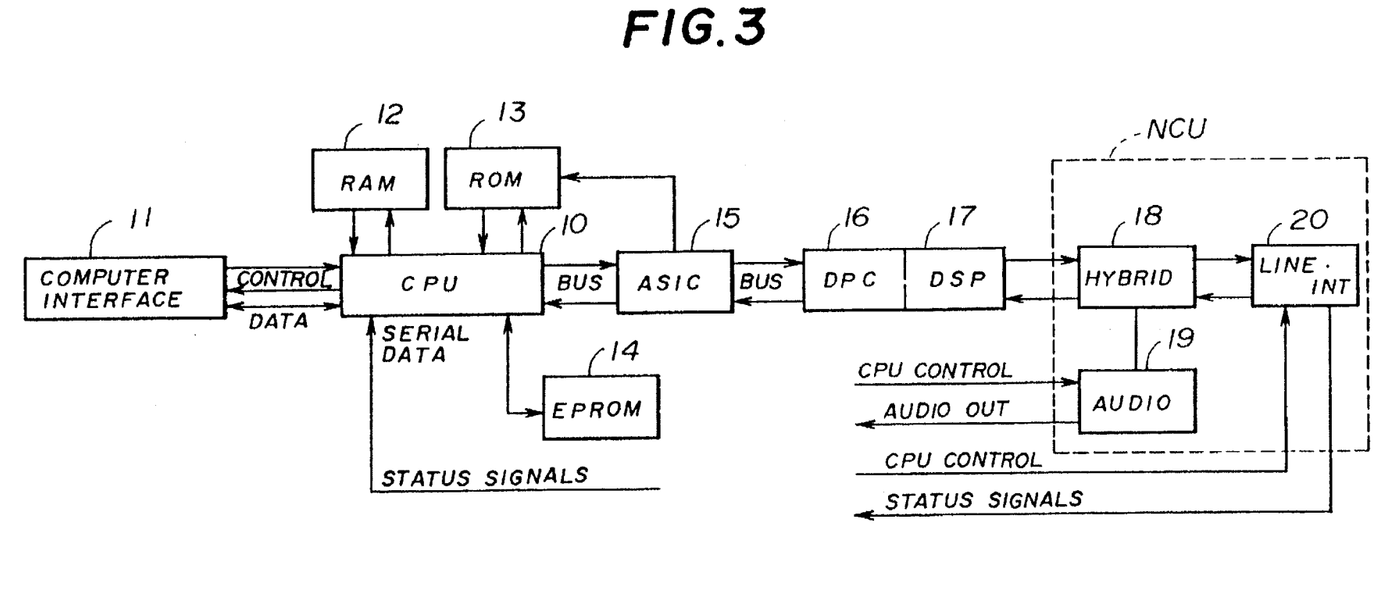
FIG. 3 is a system block diagram showing a first embodiment of a modem unit according to the present invention.

A modem unit shown in FIG. 3 generally includes a central processing unit (CPU) 10, a computer interface 11, a read only memory (RAM) 12, a read only memory (ROM) 13, an erasable programmable ROM (EPROM) 14, a logic integrated circuit (ASIC) 15, a data pump chip (DPC) 16, a digital signal processor (DSP) 17, a hybrid circuit 18, an audio circuit 19 and a line interface 20 which are coupled as shown.

The CPU 10 carries out a serial command processing related to a host interface (not shown) and also carries out processings of other commands. In addition, the CPU 10 controls the general operation of the modem unit, that is, the DPC 16 and the DSP 17, including control of the audio circuit 19.

The computer interface 11 receives a command from a host (not shown) via the host interface and returns a response based on the received command.

The RAM 12 and the ROM 13 are used as work areas. The EPROM 14 adjusts the modem interface together with the CPU 10.

The logic IC 15 is made up of a group of ICs so as to realize optimum functions suited for a specific purpose. In this first embodiment, the logic IC 15 includes logic circuits exclusively for performing bus gate control and an address decoding necessary for data transfer between the CPU 10 and the DPC 16.

The DPC 16 forms a data communication modem in conformance with the CCITT Recommendations V21, V22, V22bis, V32. On the other hand, the DSP 17 forms a facsimile communication modem in conformance with the CCITT Recommendations V21, V27ter, V29.

The hybrid circuit 18, the audio circuit 19 and the line interface 20 form a network control unit (NCU). The hybrid circuit 18 determines the route of the analog signal input/output with respect to the line, and also has an amplifier function for adjusting the magnitude or level of the signal. The hybrid circuit 18 thus provides an interface between the DSP 17 and the NCU. The audio circuit 19 supplies the analog signal input from the line to a speaker (not shown) of the personal computer (not shown), for example. The line interface 20 detects the ringing signal from the line and notifies the personal computer by an interrupt signal.

Next, a description will be given of the operation of this first embodiment by referring to a facsimile communication sequence shown in FIG. 4. The sequence shown in FIG. 4 and the sequences shown in FIGS. 6 and 7 which will be described later are controlled by the CPU 10 shown in FIG. 3.

In a step [1], a transmitting station Tx calls a receiving station Rx. It is assumed for the sake of convenience that the transmitting station Tx and the receiving station Rx respectively have the modem unit shown in FIG. 3.

In a step [2], the receiving station Rx sends a called station identification (CED), that is, an answer tone, when the call is received.

In a step [3], the receiving station Rx sends a digital identification signal (DIS) in succession to the CED so as to indicate that the receiving station Rx is a Group III facsimile machine. The DIS is a Group III standard function information frame. In addition, the receiving station Rx sends a non-standard facilities (NSF) in succession to the DIS. This NSF is a non-standard function information frame. A bit is set in the function information of the NSF to indicate that a data communication modem in conformance with V22, V22bis, V32 or the like exists. The bit assignment of the NSF can easily be extended by using reserve bits.

In a step [4], if the transmitting station Tx has the data communication modem function, the transmitting station Tx notifies the receiving station Rx that a data communication modem exists by a bit of a non-standard set-up (NSS), by sending the NSS. This NSS is a transmitting mode information frame. The bit assignment of the NSS can also be extended by using the reserve bits (extended area). A transmission is made at a maximum speed of the data modem from the frame of the NSS. On the other hand, if the transmitting station Tx does not have a data communication modem, the transmitting station Tx operates according to the normal Group III facsimile sequence.

In a step [5], the transmitting station Tx makes a high-speed modem training for the image transfer following the frame of the NSS by sending a training check (TCF), and switches from the data communication modem to the facsimile communication modem. Because the image is transmitted according to V27ter and V29 of the Group III modem, the transmitting station Tx also sends training data for determining the modem speed.

In a step [6], the receiving station Rx checks the training data of the set speed, and sends a confirmation to receive (CFR) if the training data is satisfactory. The CFR is an answer frame, and this CFR is also transmitted by the data communication modem. Thereafter, the frames of the printer messages are all transmitted by the data communication modem.

In a step [7], the transmitting station Tx transmits the image data by the facsimile communication modem when the CFR is received.

In a step [8], the transmitting station Tx sends an end of procedure (EOP) by the data communication modem if the image data transmission is completed. The EOP is a post message. If the transmitting station Tx is communicating by the data communication modem, the transmitting station Tx simply waits for a response because the communication is made by the full duplex communication. If the transmitting station Tx receives a message confirmation (MCF) from the receiving station Rx as the response, the series of sequences have been completed, and thus, the transmitting station Tx sends a disconnect (DCN) to open the line.

According to the first embodiment, both the data communication modem and the facsimile communication modem are provided, and a data communication is made via the data communication modem in the case of the facsimile message and a facsimile communication is made via the facsimile communication modem in the case of the image data. When making the facsimile communication, the message communication of the Group III protocol can be made at a higher speed than the conventional V21 mode. As a result, it is possible to shorten the communication time.

Next, a description will be given of a second embodiment of the modem unit according to the present invention, by referring to FIG. 5.

Figure 5A:
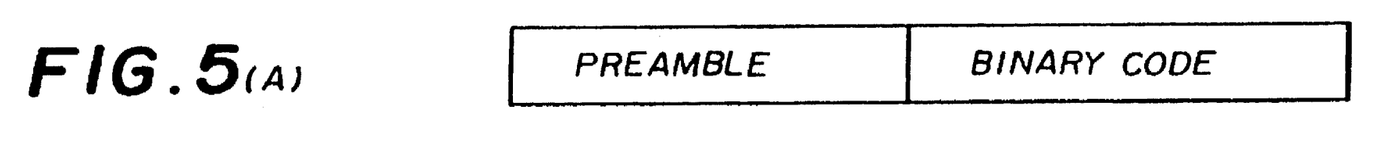
Figure 5B:
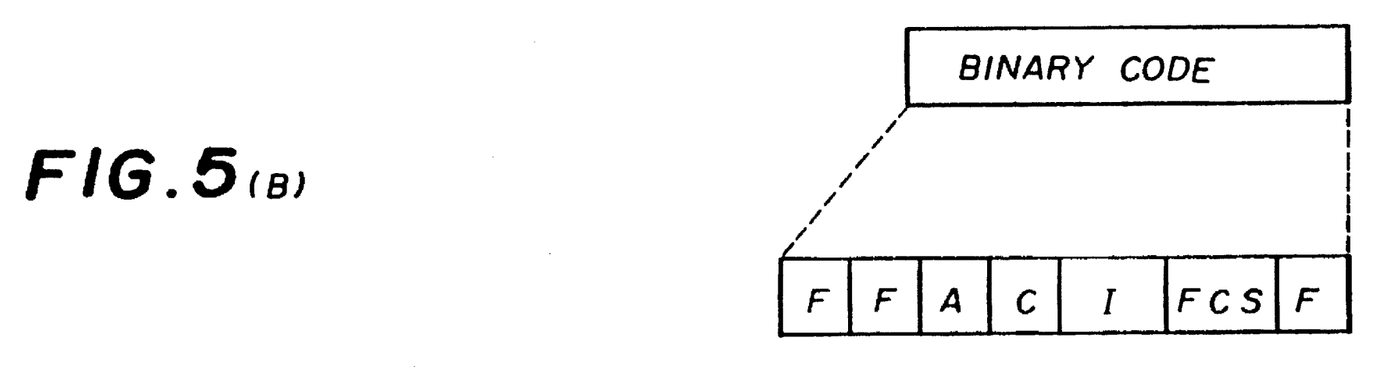

Conventionally, a binary code is transmitted after a preamble as shown in FIG. 5 (A). But in this embodiment, the CPU 10 controls the facsimile communication modem so that the preamble is omitted and the binary code is transmitted with a binary frame format shown in FIG. 5 (B). In other words, the flag transfer of the preamble is omitted. In FIG. 5 (B), F denotes a start/end flag, A denotes an address field, C denotes a control field, I denotes an information field, and FCS denotes a frame check sequence of the high-level data link control (HDLC) procedure.

In the Group III facsimile machine, it is prescribed that the preamble is transmitted for a time of 1000 ms. On the other hand, the data communication modems can synchronize each other. Hence, in this second embodiment, the necessary data are transferred after the preparations for the data transfer are completed between the two data communication modems. As a result, it is possible to shorten the communication time.

Figure 6:
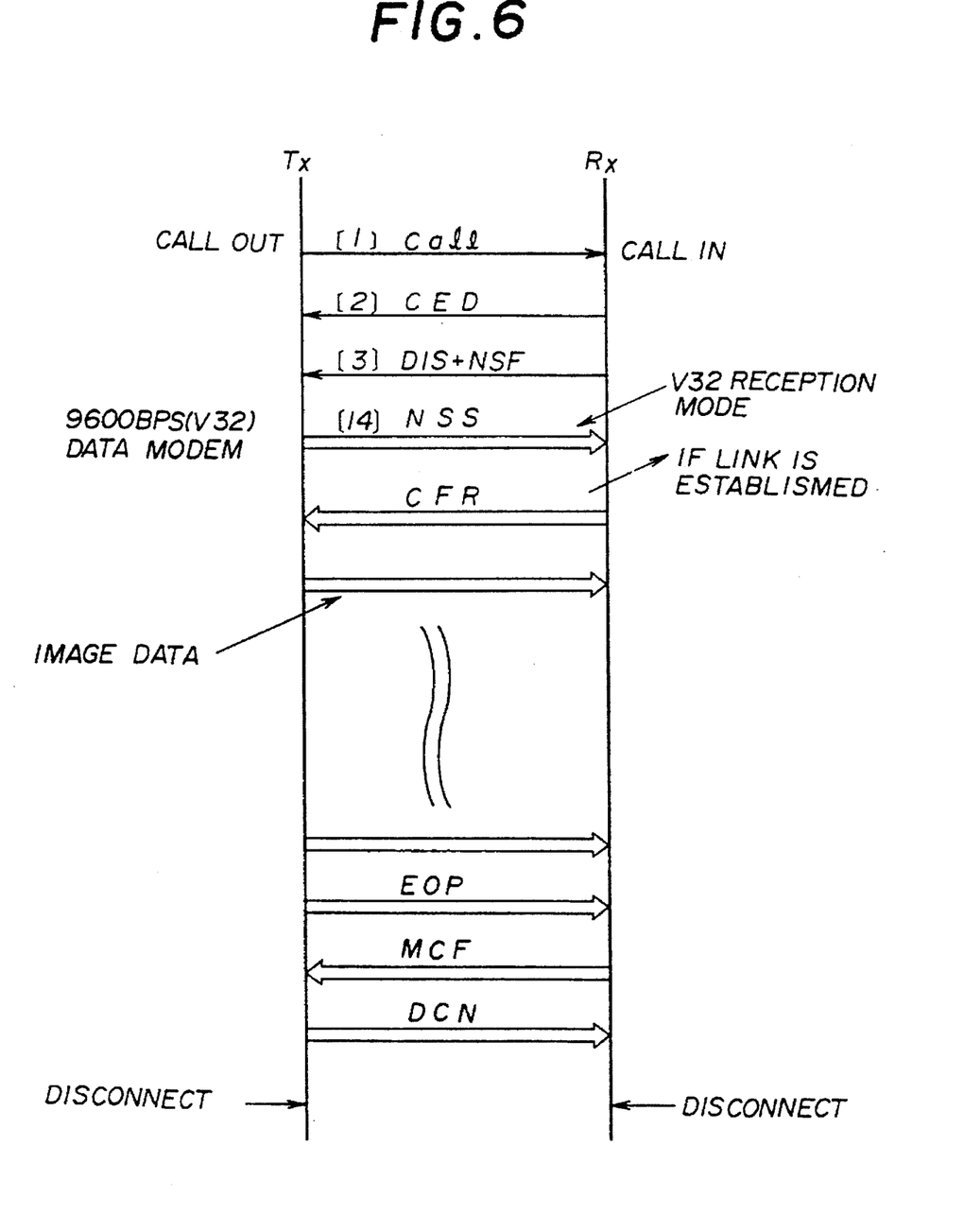
FIG. 6 is a sequence diagram for explaining the operation of a third embodiment of the modem unit according to the present invention.

Next, a description will be given of a third embodiment of the modem unit according to the present invention, by referring to FIG. 6. In FIG. 6, those steps which are the same as those corresponding steps in FIG. 4 are designated by the same reference numerals, and a description thereof will be omitted.

FIG. 6 shows the transfer sequence of the image data when the transmission speed is set to 9600 bps in the data communication modem (V32). The steps [1] through [3] are the same as those shown in FIG. 4.

In a step [14], the transmitting station Tx tries transmission of the NSS in the V32 mode if the NSF includes the V32 function. If this try is successful, the transmission is thereafter made in the V32 mode. On the other hand, if the try is unsuccessful, the communication is made based on the sequence shown in FIG. 4 by the steps [5] through [9].

According to the third embodiment, if a connection is made via the data communication modem at 9600 bps hen making the facsimile protocol, the image data transfer is also carried out via the data communication modem so as to shorten the communication time. As a result, it is possible to simplify the control operation since no switching is required between a high-speed modem and a low-speed modem. In addition, the communication time is also shortened because the training sequence of the facsimile communication modem is unnecessary.

Next, a description will be given of a fourth embodiment of the modem unit according to the present invention.

Figure 4:
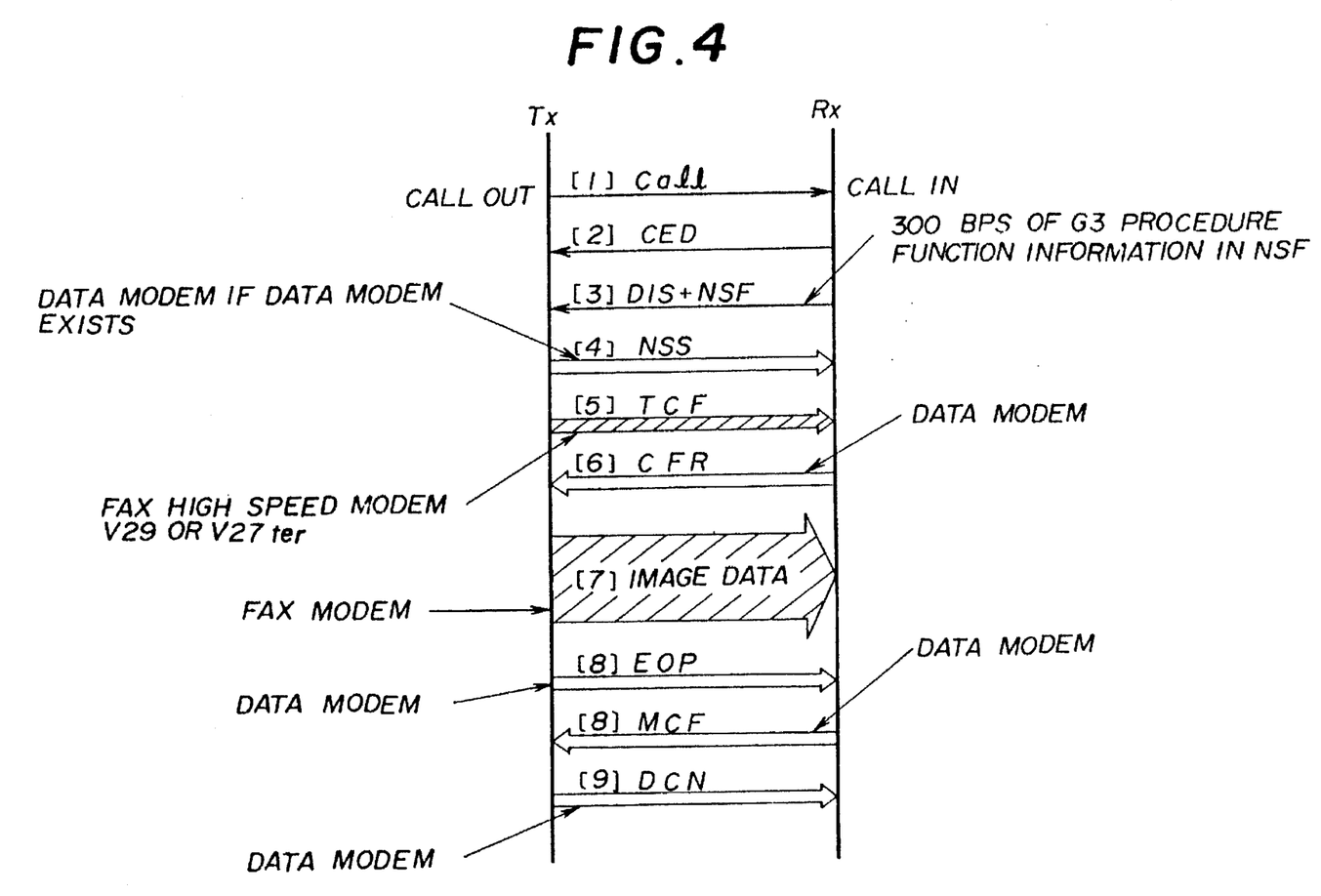
FIG. 4 is a sequence diagram for explaining a facsimile communication sequence of the first embodiment.

In this fourth embodiment, the data communication modem which makes the transfer according to the sequence shown in FIG. 4 or 6 carries out an error control sequence under the control of the CPU 10. This error control sequence is carried out in P0 conformance with the procedure of the MNP-class 4 or V42, for example.

According to the fourth embodiment, it is possible to improve the quality of the communication by carrying out the error correction.

Figure 7:
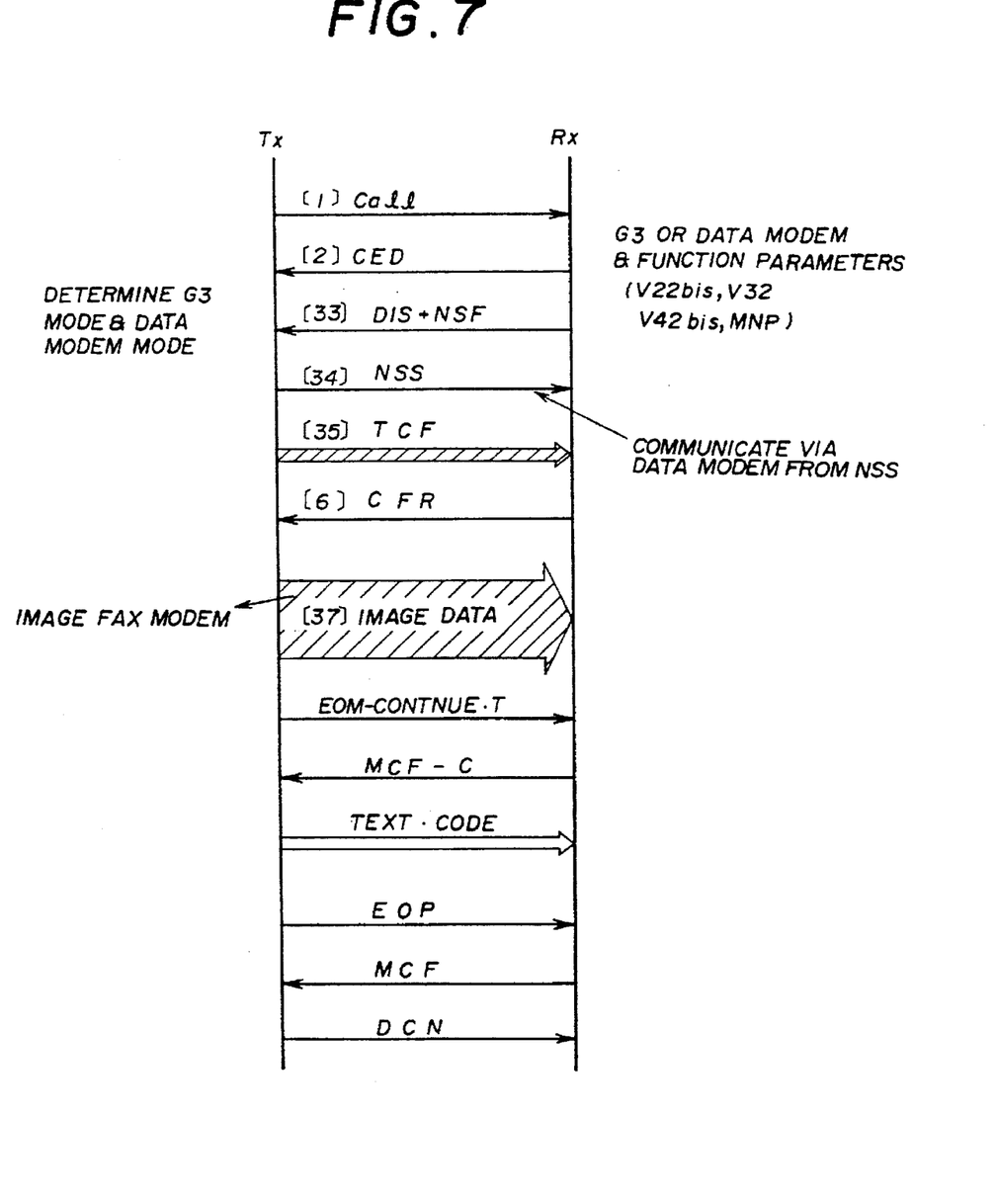
FIG. 7 is a sequence diagram for explaining the operation of a fourth embodiment of the modem unit according to the present invention.

Next, a description will be given of a fifth embodiment of the modem unit according to the present invention, by referring to FIG. 7. In FIG. 7, those parts which are the same as those corresponding parts in FIG. 4 are designated by the same reference numerals, and a description thereof will be omitted.

FIG. 7 shows the transfer procedure of a text file and an image file. The steps [1] and [2] are the same as those shown in FIG. 4.

In a step [33], the receiving station Rx sends the NSF in succession to the DIS, but it is indicated within the NSF that the receiving station Rx includes both the text transfer function and the image transfer function.

In a step [34], the transmitting station Tx sends the NSS, but the transfer sequence of the text and image files and the number of files are indicated within the NSS.

Figure 8:
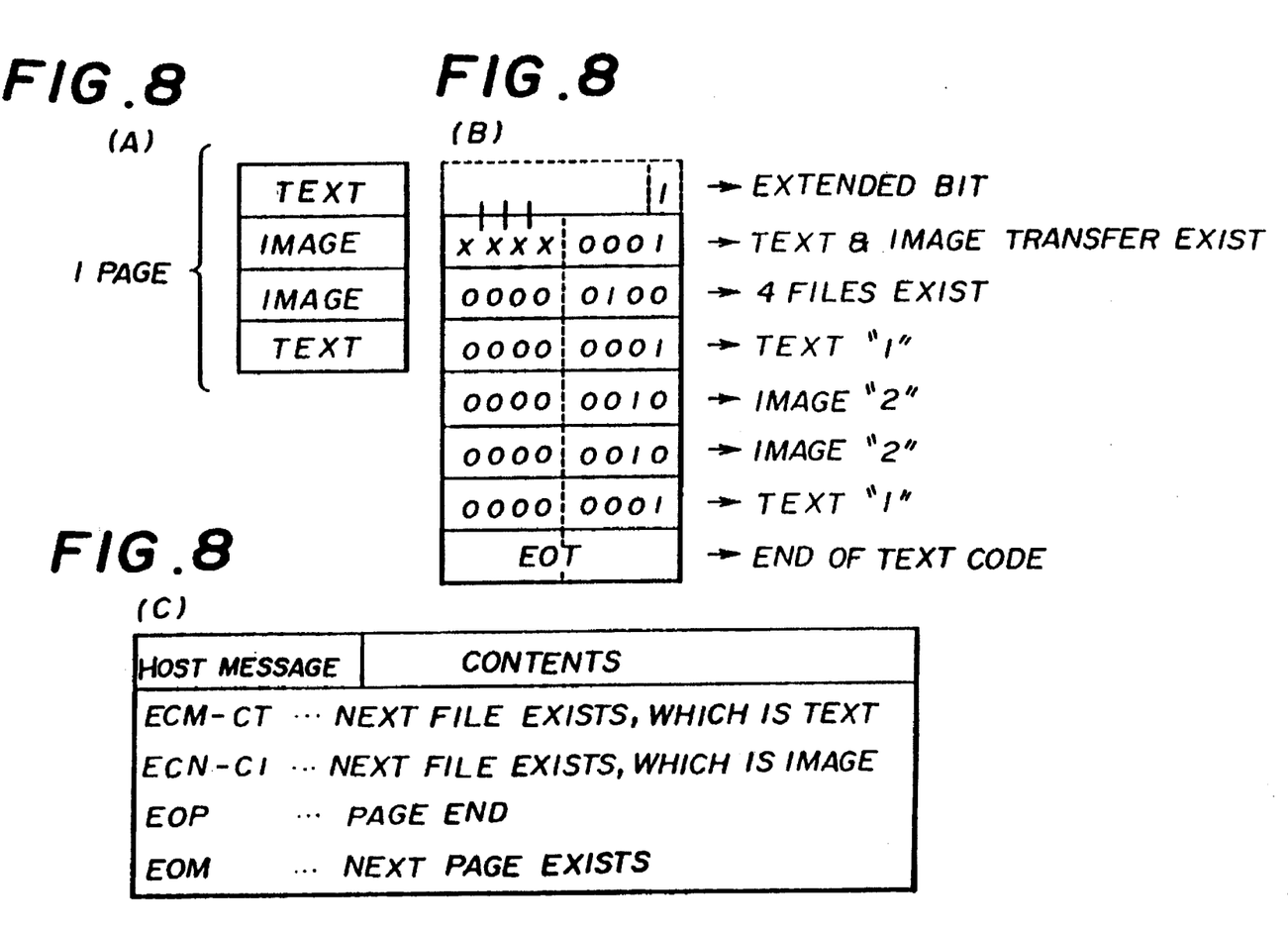

For example, if the text and image files shown in FIG. 8 (A) are to be transferred, it is 20 indicated in the extended bytes of the NSS that the files are to be transferred in the sequence "text file"→ "image file"→ "image file"→ "text file" and that the number of files is "4". FIG. 8 (B) shows bit assignments of the extended bytes of the NSS. The data shown in FIG. 8 (B) are added to the frame data of the NSS and transmitted therewith.

In a step [35], the transmitting station Tx sends the TCF to first make the training of the facsimile communication modem, and determines the modem speed.

The step [6] is the same as that shown in FIG. 4.

In a step [37], the transmitting station Tx transmits the text file and then the image file after confirming the CFR from the receiving station Because the text file is transmitted first, the transmitting station Tx transfers the data of the text file using the data communication modem. After this transfer ends, a file shown in FIG. 8 (C) is indicated by a host message.

The transfer ends with the MCF (response) after the transfer of the last file, and the transmitting station Tx sends a disconnect (DCN) to disconnect the line.

According to the fifth embodiment, the negotiation of the file transfer procedure is made via the data communication modem, and the text and image files are transferred. The text file is transferred via the data communication modem, and the image file is transferred via the facsimile communication modem. In addition, it becomes possible to perform an image editing by an application of the host enabling simultaneous transfer of the text (code) files and image files.

Next, a description will be given of a sixth embodiment of the modem unit according to the present invention.

In this sixth embodiment, referring to the sequence shown in FIG. 7, the part (text file and message) which uses the data communication modem is carried out using the data compression (MNP-class 5 and V42bis) and the error control (MNP-class 4 and V42) of the data communication modem, under the control of the CPU 10.

According to the sixth embodiment, it is possible to shorten the transfer time of the text and image files, and also improve the quality of the communication.

Next, a description will be given of a seventh embodiment of the modem unit according to the present invention.

In this seventh embodiment, the transmitting station Tx notifies the receiving station Rx of the kind of characters, that is, the font code, which is used in the text file, in the form of a text file under the control of the CPU 10. The transfer of the text and image files is otherwise the same as that shown in FIG. 6 or 7.

According to the seventh embodiment, it is possible to make the shape of the character viewed at the transmitting station the same as that viewed at the receiving station. In addition, because the font code may be made variable, it is possible to transfer unique shapes.

In each of the embodiments described above, the modem unit may of course take the form of an IC card. However, it is not essential that the modem unit according to the present invention take the form of an IC card.

Further, the present invention is not limited to these embodiments, but various variations and modifications may be made without departing from the scope of the present invention.

What is claimed is:

1. A modem unit comprising:

a full-duplex data communication modem having data communication functions;

a half-duplex facsimile communication modem having facsimile communication functions; and control means, coupled to said data communication modem and said facsimile communication modem, for controlling said data communication modem and said facsimile communication modem such that facsimile communication is carried out by communicating by non-image facsimile data via said data communication modem and communicating image facsimile data via said facsimile communication modem or said data communication modem, wherein said control means negotiates a file transfer procedure wherein said data communication modem communicates text data and said facsimile communication modem communicates image data, and wherein said data communication modem communicates a font code corresponding to said text data prior to communicating said text data.

2. A modem unit according to claim 1, wherein said control means prescribes a non-image facsimile data communication format compatible with a facsimile communication protocol of said facsimile communication modem such that a preamble to non-image facsimile data required by said facsimile communication protocol may be omitted.

3. A modem unit according to claim 1, wherein said data communication modem communicates both non-image facsimile data and image facsimile data when a second modem unit with which said modem unit communicates is capable of communicating image facsimile data and non-image facsimile data at a speed employed by said data communication modem in compliance with a facsimile communication protocol of said facsimile communication modem.

4. A modem unit according to claim 1, wherein said data communication modem performs error correction operations in accordance with the MNP-class 4 standard or the V.42 standard when communicating non-image facsimile data.

5. A modem unit according to claim 1, wherein said data communication modem performs error correction operations and data compression operations while communicating text data.

6. A modem unit according to claim 5, wherein said error correction operations are performed in accordance with the MNP-class 4 standard or the V.42 standard, and said data compression operations are performed in accordance with the MNP-class 5 standard or the V.42bis standard.

7. A modem unit according to claim 1, wherein said data communication modem communicates a font code corresponding to text data prior to communicating said text data.

8. A modem unit according to claim 1, wherein said data communication modem, said facsimile communication modem, and said control means are provided on a single integrated circuit card.

9. A method of communicating data via a modem unit having a full-duplex data communication modem and a half-duplex facsimile communication modem, comprising the steps of:

transmitting, via said data communication modem, a call signal to a receiving modem unit to notify said receiving modem unit that data is to be communicated;

transmitting, via said data communication modem, a signal to said receiving modem unit indicating the full-duplex and half-duplex capabilities of said modem unit;

receiving, via said data communication modem, a call identification signal from said receiving modem unit indicating that said call signal was received thereby;

receiving, via said data communication modem, a digital identification signal from said receiving modem unit indicating that said receiving modem unit communicates data in accordance with a facsimile communication protocol of said facsimile communication modem;

receiving, via said data communication modem, a non-standard facilities signal from said receiving modem unit indicating that said receiving modem unit comprises a data communication modem that communicates data in accordance with a data communication protocol;

transmitting, via said data communication modem, a non-standard set-up signal to said receiving modem unit indicating which of said full-duplex and half-duplex capabilities has been selected by said modem unit;

transmitting, via said data communication modem, a training check signal to said receiving modem unit which switches communication operation from said full-duplex data communication modem to said half-duplex facsimile communication modem when said half-duplex capability is selected and indicates a speed of said facsimile communication modem;

receiving, via said data communication modem, a confirmation signal from said receiving modem unit indicating acknowledgement and acceptance of said training check signal;

transmitting image facsimile data via said facsimile communication modem or said data communication modem to said receiving modem unit;

transmitting, via said data communication modem, an end of procedure signal indicating that image facsimile data transmission is completed;

receiving, via said data communication modem, a method confirmation signal from said receiving modem unit indicating acknowledgement and acceptance of said end of procedure signal; and transmitting, via said data communication modem, a disconnect signal to said receiving modem unit to terminate connection thereto, wherein said data communication modem communicates text data and said facsimile communication modem communicates image data, and wherein said data communication modem communicates a font code corresponding to said text data prior to communicating said text data.

10. A method of communicating data according to claim 9, wherein non-image facsimile data is communicated in accordance with a data communication format that is compatible with said facsimile communication protocol of said facsimile communication modem such that a preamble to said non-image facsimile data required by said facsimile communication protocol may be omitted.

11. A method of communicating data according to claim 9, wherein said data communication modem communicates both non-image facsimile data and image facsimile data when said receiving modem unit is capable of communicating image facsimile data and non-image facsimile data at a speed employed by said data communication modem in compliance with a facsimile communication protocol of said facsimile communication modem.

12. A method of communicating data according to claim 9, wherein said data communication modem performs error correction operations in accordance with the MNP-class 4 standard or the V.42 standard when communicating non-image facsimile data.

13. A method of communicating data according to claim 9, wherein said data communication modem performs error correction operations and data compression operations while communicating text data.

14. A method of communicating data according to claim 13, wherein said error correction operations are performed in accordance with the MNP-class 4 standard or the V.42 standard, and said data compression operations are performed in accordance with the MNP-class 5 standard or the V.42bis standard.

15. A method of communicating data according to claim 9, wherein said data communication modem communicates a font code corresponding to text data prior to communicating said text data.

* * * * *